United States Patent
Gleckman et al.

(10) Patent No.: US 6,542,307 B2
(45) Date of Patent: Apr. 1, 2003

(54) COMPACT NEAR-EYE ILLUMINATION SYSTEM

(75) Inventors: Philip L. Gleckman, Boulder, CO (US); Miller Schuck, Nederland, CO (US)

(73) Assignee: Three-Five Systems, Inc., Tempe, AZ (US)

(*) Notice: Subject to any disclaimer, the term of this patent is extended or adjusted under 35 U.S.C. 154(b) by 92 days.

(21) Appl. No.: 09/872,073

(22) Filed: Jun. 1, 2001

(65) Prior Publication Data
US 2002/0191297 A1 Dec. 19, 2002

Related U.S. Application Data

(60) Provisional application No. 60/242,189, filed on Oct. 20, 2000.

(51) Int. Cl.[7] .......................... G02B 27/14; G02B 5/04; G02B 27/10
(52) U.S. Cl. ...................... 359/638; 359/833; 359/834; 359/627
(58) Field of Search ................... 359/629, 638, 359/640, 833, 834, 618, 619, 627, 630, 639; 348/756; 353/20, 31; 345/7, 8, 9, 13, 14, 42, 43, 51, 54

(56) References Cited

U.S. PATENT DOCUMENTS

| | | | |
|---|---|---|---|
| 3,559,090 A | 1/1971 | Refermat et al. | 359/583 |
| 3,748,015 A | 7/1973 | Offner | 359/366 |
| 3,787,109 A | 1/1974 | Vizenor | 359/631 |
| 4,049,944 A | 9/1977 | Garvin et al. | 219/121.2 |
| 4,415,233 A | 11/1983 | Itoh et al. | 359/582 |
| 4,514,479 A | 4/1985 | Ferrante | 430/2 |
| 4,854,688 A | 8/1989 | Hayford et al. | 359/433 |
| 4,969,730 A * | 11/1990 | van den Brandt | 353/31 |
| 5,151,722 A | 9/1992 | Massof et al. | 351/158 |
| 5,212,375 A | 5/1993 | Goto et al. | 250/201.7 |
| 5,285,318 A | 2/1994 | Gleckman | 359/709 |
| 5,440,197 A | 8/1995 | Gleckman | 313/110 |
| 5,446,710 A | 8/1995 | Gardner et al. | 369/44.14 |
| 5,450,237 A | 9/1995 | Yoshida et al. | 359/562 |
| 5,621,486 A * | 4/1997 | Doany et al. | 348/756 |
| 5,663,833 A | 9/1997 | Nanba et al. | 359/631 |
| 5,684,354 A | 11/1997 | Gleckman | 313/110 |
| 5,696,521 A | 12/1997 | Robinson et al. | 345/8 |
| 5,748,368 A | 5/1998 | Tamada et al. | 359/486 |
| 5,768,025 A | 6/1998 | Togino et al. | 359/633 |
| 5,771,124 A | 6/1998 | Kintz et al. | 359/633 |
| 5,777,789 A * | 7/1998 | Chiu et al. | 359/494 |
| 5,790,312 A | 8/1998 | Togino | 359/631 |

(List continued on next page.)

FOREIGN PATENT DOCUMENTS

| | | | |
|---|---|---|---|
| EP | 0945748 A2 | 9/1999 | G02B/27/01 |
| EP | 1 043 619 A2 | 10/2000 | |
| EP | 1 089 111 A1 | 4/2001 | |
| JP | 2291516 A2 | 12/1990 | G02B/23/24 |

*Primary Examiner*—Georgia Epps
*Assistant Examiner*—Gary O'Neill
(74) *Attorney, Agent, or Firm*—Ingrassia Fisher & Lorenz, P.C.

(57) ABSTRACT

An enhanced illumination system for a micro-display comprises an illuminator for a reflective display panel having a light source and a prism. The prism has a first substantially planar face proximate to the light source and to the display panel, so that light propagates from the light source into the prism through the first face and is redirected to the display panel through the first face. A second face of the prism is positioned opposite the light source so that light reflected from the display panel impinges on the second face and propagates to imaging optics. The illuminator may also include an auxiliary prism optically coupled to the second face of the first prism to correct for astigmatism of the reflected light from the display panel and a beam splitter between the first prism and the auxiliary prism.

18 Claims, 6 Drawing Sheets

U.S. PATENT DOCUMENTS

| | | | |
|---|---|---|---|
| 5,795,049 A | 8/1998 | Gleckman | 353/122 |
| 5,886,822 A | 3/1999 | Spitzer | 359/630 |
| 5,892,325 A | 4/1999 | Gleckman | 313/578 |
| 5,892,624 A | 4/1999 | Kintz et al. | 359/637 |
| 5,995,291 A | 11/1999 | Togino | 359/631 |
| 6,005,720 A | 12/1999 | Watters et al. | 359/633 |
| 6,023,373 A | 2/2000 | Inoguchi et al. | 359/633 |
| 6,036,318 A * | 3/2000 | Itoh | 353/20 |
| 6,038,005 A | 3/2000 | Handschy et al. | 349/61 |
| 6,046,867 A | 4/2000 | Rana | 359/831 |
| 6,122,103 A | 9/2000 | Perkins et al. | 359/486 |
| 6,204,975 B1 | 3/2001 | Watters et al. | 359/633 |
| 6,222,676 B1 | 4/2001 | Togino et al. | 359/630 |
| 6,398,364 B1 * | 6/2002 | Bryars | 353/31 |
| 2002/0036831 A1 | 3/2002 | Inoguchi et al. | 359/630 |

* cited by examiner

COMPACT NEAR-EYE ILLUMINATION SYSTEM

CROSS-REFERENCE TO RELATED APPLICATIONS

This application claims the priority of Provisional Application Ser. No. 60/242,189, filed on Oct. 20, 2000.

BACKGROUND OF THE INVENTION

1. Field of the Invention

The invention relates generally to the field of illuminators for small displays. More particularly, the invention relates to compact imaging systems using folded optical paths to illuminate a small reflective display.

2. Description of the Related Art

Liquid Crystal on Silicon (LCoS) micro-displays such as the CMD8X6D and CMD8X6P available from Zight Corporation of Boulder Colo. provide great advantages for compact near-eye applications. LCoS micro-displays produce a high resolution image by changing the polarization state of incident light. In the dark state, a pixel reflects light with substantially no change in polarization. In the bright state, the pixel rotates the polarization state of reflected incident light to the corresponding orthogonal state. By illuminating the display with polarized light and then filtering out nearly all reflected light of that polarization, the display image can be viewed by the human eye. Other miniature displays use either polarization effects or reflectivity changes to produce an image.

Typically, the display is illuminated with pulsed red, green, and blue light while the display is synchronized to the pulsed light source to reflect the appropriate color component of the image. The rapidly alternating red, green, and blue images are blended in human perception to form the full-color image of the display. However, the display can also be illuminated with monochromatic light for data or targeting displays. Such displays are used, for example in helmet, windshield, and visor projection systems as well as in small portable headsets and handsets for private display viewing and for virtual reality systems.

A typical illumination and eyepiece system using pulsed LEDs to illuminate the display and a polarizing beam splitter to conduct the reflected bright light to a viewer is shown, for example, in U.S. Pat. No. 6,038,005 to Handschy et al, FIG. 18A. In that patent, the light from the pulsed LEDs is diffused, then collimated by a Fresnel lens and directed to a polarizing beam splitter cube. The cube reflects polarized light from the LEDs to the micro-display. The polarized light is reflected from the micro-display back toward the beam splitter cube. If the polarization state of the light has been rotated then it will pass through the beam splitter cube to an eyepiece that images the reflected light for the viewer. If the light is reflected from the micro-display without a change in polarization, then it will be reflected by the beam splitter cube away from the viewer and back toward the LED source.

A more compact frontlight suitable for use with reflective displays such as an LCoS micro-display is shown in U.S. Pat. No. 6,005,720 to Watters et al. This design has a cemented prism block with an internal polarizing beam splitter 26, 14, 30. A Fresnel element 22, used as a collimator and a pre-polarizer 24, filters out all but the S-polarized light. However, this prism design is very bulky and results in a thicker, deeper, and heavier overall form factor. In addition additional optical elements 62 are required to give a wider field of view for the user. Secondly, the design in the above-mentioned patent provides a telecentric pupil. A significantly non-telecentric design, for both the frontlight and the eyepiece can significantly improve compactness.

BRIEF SUMMARY OF THE INVENTION

A method and apparatus are described that provide an enhanced illuminator for a micro-display. In one embodiment, the invention is an illuminator for a reflective display panel having a light source and a prism. The prism has a first substantially planar face proximate to the light source and to the display panel, so that light propagates from the light source into the prism through the first face and is redirected to the display panel through the first face.

A second face of the prism opposite the light source so that light reflected from the display panel impinges on the second face to propagate to imaging optics. The illuminator may also include an auxiliary prism optically coupled to the second face of the first prism to correct for astigmatism of the reflected light from the display panel and a beam splitter between the first prism and the auxiliary prism, wherein light from the light source is reflected by the beam splitter to the imaging optics.

In another embodiment, the invention is an illuminator for a reflective display panel having a light source, a converging optical element to receive light from the light source and a prism. The prism has a first face to receive light from the converging optical element, the prism receiving light from the light source and redirecting it as diverging light to the display panel, and a second face opposite the display panel for receiving light reflected from the display panel and propagating the reflected light to imaging optics.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
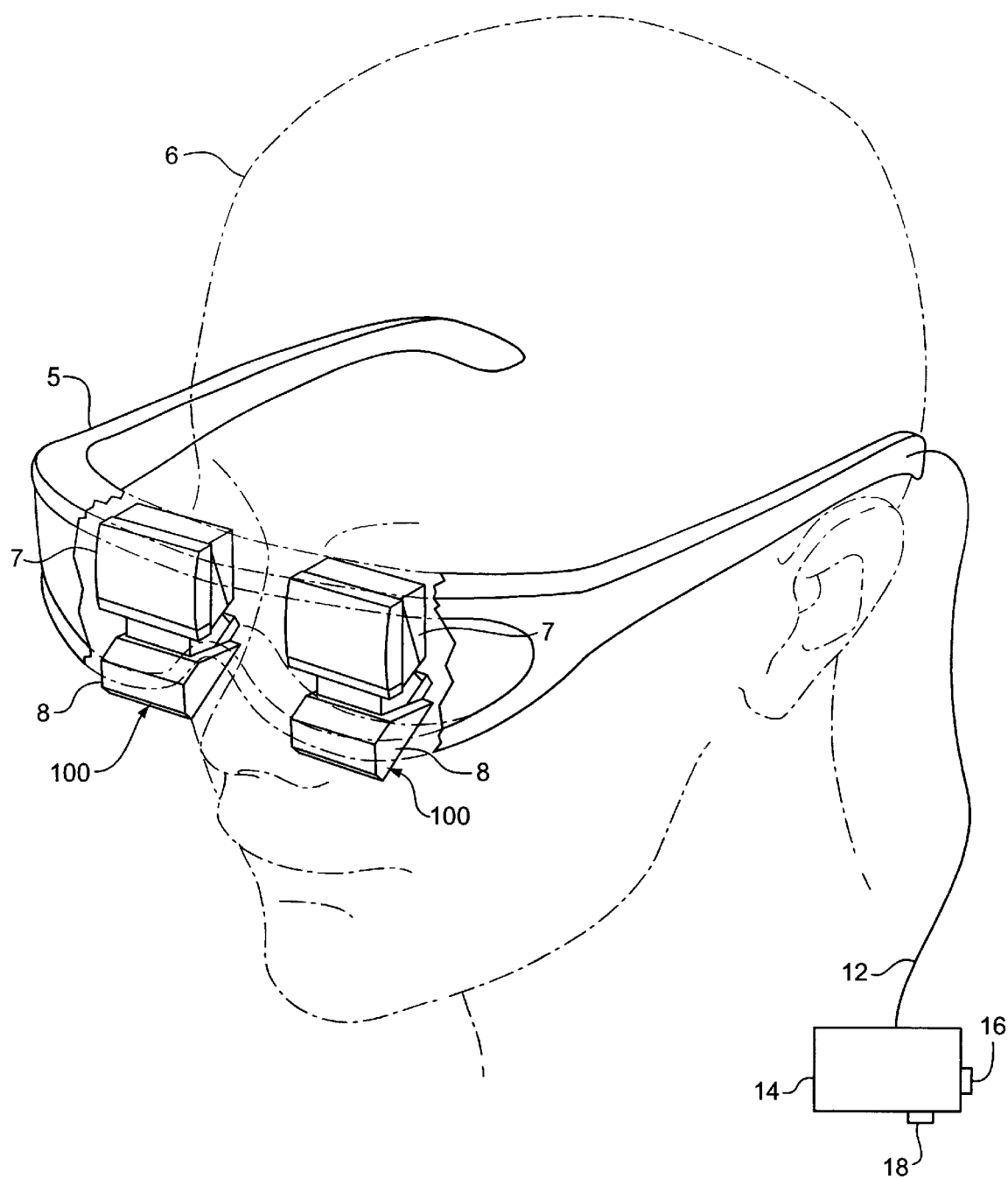
FIG. 1 is a perspective, partially cut-away view of a headset being worn by a viewer or user according to one embodiment of the present invention.

As shown in FIG. 1, one embodiment of the present invention is as a binocular display screen headset 5 configured to be worn on the head of a user or viewer 6. The headset 5 has a pair of small-area color displays 100 disposed within the headset. In one embodiment, the displays include LCoS panels available from Zight Corporation Each of the displays has a display panel (not shown) positioned behind an eyepiece 7, that is directly in front of a respective eye of the user so that each eye views a single one of the displays. In one embodiment, the pixellated areas of each of the display panels is rectangular, 9.6 mm wide and 7.2 mm high. The headset is configured to fit comfortably against the face of the user with or without eyeglasses between the user and the headset eyepieces. Each of the displays 100 includes a lighting apparatus 8, shown in more detail in FIGS. 2 through 6, to illuminate the display panel. Due to the low upper profile of the headset, the user can also look over the headset preventing possible problems with "full immersion".

The headset is coupled through a cable 12 or a wireless connection to a display driver 14. The display driver receives video signals through a port 16 and power through a power connector 18 and converts the video signals into a form suitable for driving the displays. The video signals can be from a television, computer, video player or any other video or data source. The video can be for single or for stereovision in which the two displays project different images to simulate perspective. Alternatively, the headset can be a monocular headset with a single display, eyepiece, and lighting apparatus.

Figure 2:
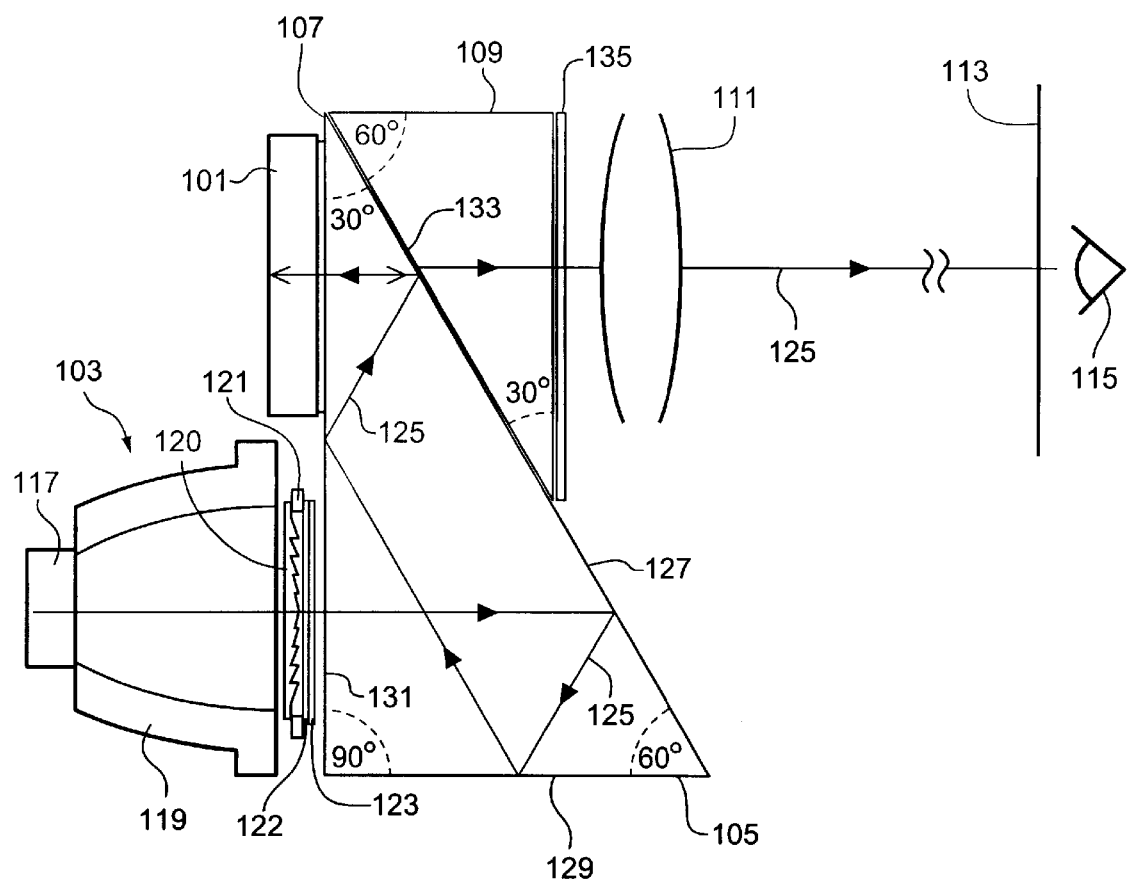
FIG. 2 is a side cross-sectional schematic view of an illumination system according to one embodiment of the invention.

FIG. 2 shows a side view of one embodiment of a lighting apparatus suitable for use, for example, in the headset of FIG. 1. A display panel 101, such as an LCoS display panel, is illuminated by collecting optics 103 that direct light to the display panel 101 through a prism 105. Light reflected off the display panel 101 is transmitted through a polarizing beam splitter 107 to an auxiliary prism 109. The image from the display is focused by eyepiece optics 111 to an exit pupil 113 at which it can be observed by a viewer 115.

The rectangular display panel image in one embodiment has an active area of 9.6 mm horizontal×7.2 mm vertical, while the exit pupil is 12 mm horizontal×6 mm vertical. In the collimating optics, the 2:1 pupil aspect ratio and etendue requirements are conveniently produced by optically joining two 3-in-1 RGB LED (Red, Green, Blue Light Emitting Diode) packages 117 (shown in more detail in FIGS. 5 and 6) available, for example, from Nichia Corporation of Japan. The light emitted by these packages is nearly Lambertian. To efficiently collect this light, compact rectangular non-imaging reflectors 119 are fastened to each LED package, and then tiled together to produce a rectangular output port. The rectangular output port serves as the rectangular aperture stop 121 of a Kohler illumination system. Using Kohler illumination principles, efficient illumination is obtained by forming a sharp image of the rectangular aperture stop 121 at the rectangular exit pupil 113. A factor of five efficiency improvement over commonly-used cavity-based frontlights can be achieved. For a narrower exit pupil, e.g. 6–8 mm in the horizontal direction, a single LED package reflector can be used.

In FIG. 2, light from the LED reflector funnels 119 passes through an optical element, such as a Fresnel lens 120 and is pre-polarized with a dichroic polarizer 123. This dichroic polarizer can be made for example using an iodine-based PVA (poly-vinyl alcohol) film, a conventional iodine-based type linear polarizer film that transmits only S-polarized light, although other polarizer designs can also be used. A Diffuser 122 is placed before the polarizer to make the output of the collection optics uniform. A weakly scattering diffuser can be used in order to maintain high throughout. In another embodiment, the diffuser is located at the LED package before the LED light enters the cone from the LED package.

The main prism 105 has a triangular cross-section. The triangle is a 90°–60°–30° triangle with the 90° corner adjacent the pre-polarizer at the reflector funnel so that one side of the prism extends parallel to a central ray emerging from the collimating optics. The 60° corner is adjacent to this parallel side. The main prism couples the light from the reflector funnels to the display panel 101.

In order to preserve polarization when an LCoS display panel is used, a low birefringence material is used for the prism such as Schott BK7 glass from Schott Glass Technologies, or the equivalent. If a display panel that does not rely on maintaining the polarization of light incident to the display, such as a micromirror display, is used, then the prism can be formed of any other suitable optical material and the dichroic polarizer 123 is not needed. Suitable alternative optical materials include polystyrene, polycarbonate, acrylic, Zeonex and other optical plastics. The prism material in the embodiment illustrated in FIG. 2 has an index of refraction of about 1.52. Suitable adjustments can be made to accommodate other materials with different indices of refraction if desired.

The primary prism uses two mirror surfaces and total internal reflection (TIR) to fold the optical path as shown by the central ray trace 125. The first mirror surface 127 of the prism is directly facing the reflector funnels and is between the 60° and 30° corners. It folds the light path away from the display panel to the second mirror surface 129 which is between the 90° and 60° corners and is parallel to the direction of the central ray as it exits the reflector funnels. The second mirror surface folds the light back at a high angle of incidence toward the surface through which the reflector funnel light came. This is the TIR surface 131 between the 90° and 30° corners.

Light incident on a TIR surface at highly skew ray angles suffers a retardance. For linearly-polarized light (polarized by polarizer 123) incident on an untreated surface, the retardance suffered can be as high as 47 degrees under TIR. This retardance creates an elliptical polarization state. The elliptically polarized light includes a P-polarized component that is partially reflected, upon reflection from the PBS (polarizing beam splitter), and is incident on the display. This leads to a significant loss of contrast in the final image. In order to enhance contrast, a phase-optimized coating at the TIR surface is used to keep the phase shift to a maximum of, for example, 21 degrees for higher contrast.

A multi-stack dielectric coating can be used to obtain this reduction in retardance. For example, with a glass prism with an index of refraction of 1.62, a suitable coating is $Y_2O_3$ 37 nm, $ZrO_2$ 137 nm, $SiO_2$ 105 nm. The thickness of each layer can be varied by plus or minus 8 nm to 12 nm with only modest changes in performance. For this embodiment, the films should be applied to have indices of refraction of 1.75, 2.05 and 1.455, respectively. The middle layer is thicker and has a higher refractive index than the other two. Alternatively, the $Z_rO_2$ can be replaced with $HfO_2$, or $Ta_2O_5$ and the $Y_2O_3$ can be replaced with $ThO_2$. A similar retardance can also be suffered by light incident on a bare mirror at a skew angle. Accordingly, the two mirror surfaces arecoated with a dielectric-silver-dielectric coating to reduce phase shifts. The outer dielectric coating is used largely to protect the silver coating. A suitable coating is $TiO_2$ 65 nm, Silver 200 nm, $TiO_2$ 65 nm.

Phase retarders based on total internal reflection are known in the art. However, the present multi-stack dielectric coating of $Y_2O_3$, $Z_rO_2$ and $S_iO_2$ provides both anti-phase retardance and anti-reflection characteristics across the visible light spectrum and all incident angles provided in the main prism. This coating can play an important role in the present frontlight in increasing contrast and enhancing brightness. The coating stack is built on three dielectric, non-absorbing layers with indices of refraction that minimize the following difference relation $|n_1^2 n_3^2 - n_0 n_2^2 n_g|$. Where $n_o$ is the index of air (1.0), $n_g$ is the index of the glass prism (1.62), and $n_1$, $n_2$, and $n_3$ are the respective indices of refraction of the three layers. Satisfactory results can be had when the difference is at or below 0.5. In addition the coating should provide very low reflectivity (p<1.5%) and a phase shift under 21 degrees over all angles. The suggested coating satisfies these constraints while keeping the above difference at or below 0.25. Accordingly, the light emanating from the collector and the display into the prism is only minimally reflected and the TIR light undergoes little shift in relative phase.

In one embodiment, the display panel is based on LCoS (liquid crystal on silicon) technology. Such a panel reflects and rotates the linear polarization state of light for an image pixel in a bright state. For the dark state, light is reflected without any change in polarization. The lighting apparatus, accordingly, projects polarized light onto the display panel 101 and transmits any light that is rotated in phase to the viewer 115. This is accomplished using an adaptation of a polarizing beam splitter cube. The lighting apparatus includes a PBS (polarizing beam splitter) surface between the main prism 105 and the auxiliary prism 109. The pre-polarizer 123, in one embodiment, filters out all but S-polarized light, so that upon TIR, this light is directed to the PBS surface and is reflected to the display panel 101. Most of the stray P-polarized light is transmitted and does not impinge on the display panel. The S-polarized light upon striking a bright state pixel will be reflected and rotated to P-polarization by the display and transmitted through the PBS layer to the auxiliary prism 109.

A variety of different known beamsplitting devices can be used as is well-known in the art such as a polymer film stack or dielectric coating stack at the diagonal beamsplitting surface. One such device is a Double Brightness Enhancing Film (DBEF) available from 3M Corporation in the United States. For higher performance, a wire grid polarizer can be used as the PBS in place of a typical anisotropic-isotropic polymer film stack such as the DBEF. The DBEF distinguishes polarization states less effectively as the angle of incidence increases and its effect varies with color. Improved skew ray contrast control can be achieved with the wire grid polarizer as a PBS. While the DBEF has a slightly lower absorption, contrast for skew rays is significantly less than for a wire grid polarizer. Such a polarizer is described, for example, in U.S. Pat. No. 6,122,103 to Perkins et al., the disclosure of which is incorporated fully by reference herein. A suitable wire grid polarizer is the ProFlux™ polarizer, available from Moxtek of Utah in the United States.

A suitable wire grid polarizer can be created using photolithography techniques to apply an array of parallel, conductive elements to a glass plate. The plate has a low index of refraction on the order of 1.5 while the deposited wire grid is made of aluminum or any other suitably conductive material. The parallel conductive elements of the wire grid will have a pitch of about one-quarter the mean wavelength of the light used in the display (approximately 140 nm), a width of about one-half the pitch (or 50% duty cycle) and a thickness or height of about 140 nm. The specific design of the wire grid can be varied to suit different glass plate substrates, different conductive materials and different demands for reflectivity, efficiency, and wavelength characteristics.

The P-polarized light reflected from the display is analyzed by the PBS and passes to the imaging system 111 through the auxiliary prism 109. The S-polarized light reflected from the display will be reflected by the PBS and appear as dark portions of the image to a viewer. The auxiliary prism removes the astigmatism of the primary prism. Another dichroic polarizer sheet 135 can be added after the auxiliary prism to increase contrast in the final image. This polarizing analyzer 135 can be made for example using an iodine-based PVA (poly-vinyl alcohol) film. The auxiliary prism can be made of a low birefringence material similar to the main prism. Alternatively, because the optical path length through the auxiliary prism is short, optical plastics or other higher birefringence material may be used instead, such as acrylic or polycarbonate. In such an implementation, the analyzer 35 can be removed or placed between the wire grid polarizer and the auxiliary prism. A high birefringence auxiliary prism, when used with the analyzer positioned after auxiliary prism, will reduce uniformity in the brightness and color of the resulting image.

The auxiliary prism is cemented to the main prism to form the PBS as is well known in the art. The light then continues through the eyepiece 111 to the viewer 115. The auxiliary prism as well as the main prism surfaces that are not used as reflectors can also have an anti-reflection coating such as a single quarter-wave layer of MgF2 or other conventional dielectric multilayer films.

While the eyepiece 111 is shown as a single element, a more complex and compact system is often desired for use in a headset and in many other types of displays. Typical compact eyepiece design forms, such as the so-called "free surface prism" described, for example, in U.S. Pat. No. 5,768,025 to Togino et al., make use of TIR and decentered surfaces in the imaging path to maintain throughput efficiency. Decentered optical systems are susceptible to aberrations such as axial astigmatism and trapezoidal distortion. These design forms require aberration correction by complicated anamorphic aspheric surfaces having different effective focal lengths in the meridional and sagittal planes. Mold tooling for such surfaces is complex and requires long lead times for iteration.

The high efficiency of the illumination apparatus described above allows the use of catadioptric eyepiece lens design forms without the constraint of extremely high throughput efficiency, yielding much more design space freedom. A design form with significant advantages over the free surface prism is shown in co-pending patent application Ser. No. 09/872,111, filed on the same day as the present application, entitled Compact Wide Field-of-View Imaging System and assigned to the same assignee as the present application, the disclosure of which is incorporated fully by reference herein. In that eyepiece system, all of the surfaces are on-axis and rotationally symmetric, significantly reducing tooling lead time and cost. In addition, the design form provides adequate back focal length for insertion of a frontlight, which is difficult or impossible to achieve by free surface prisms.

Figure 3:
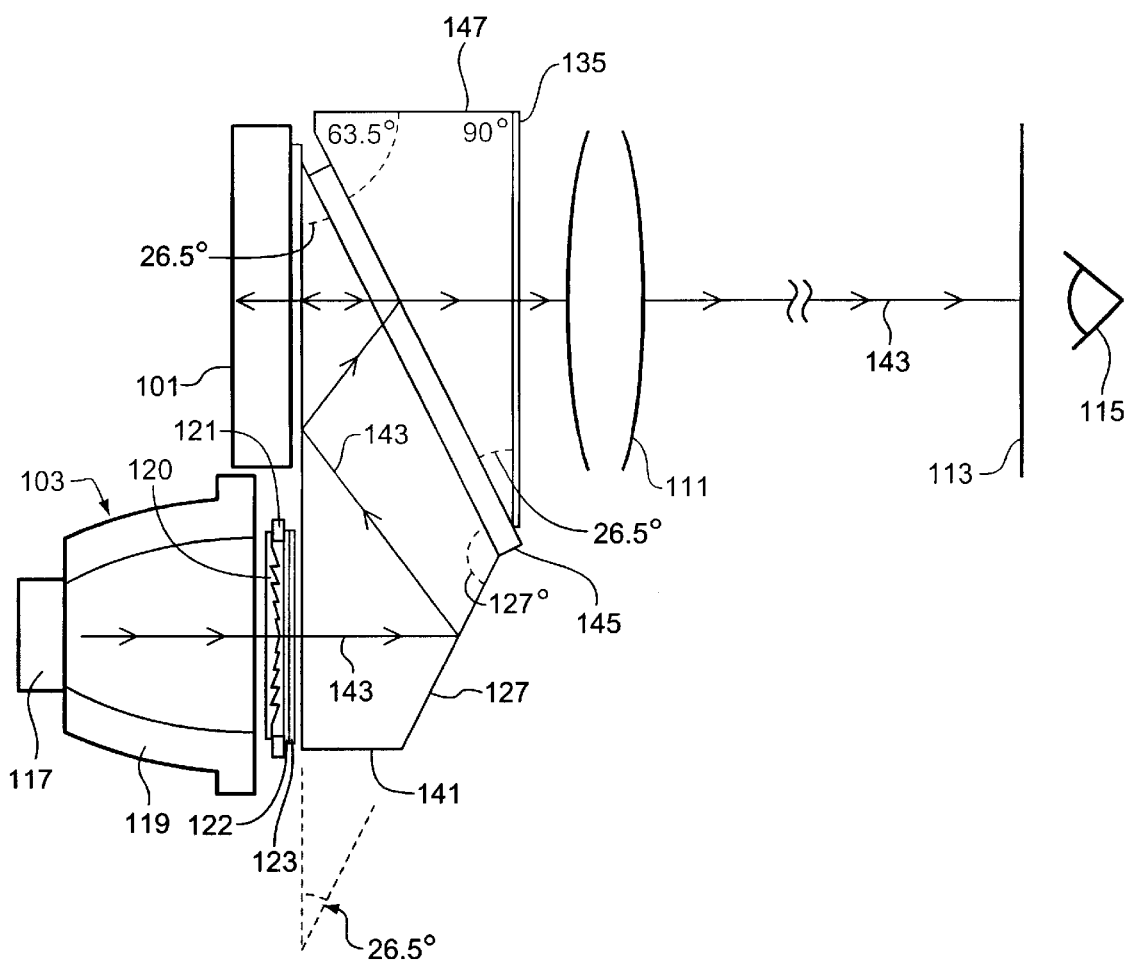
FIG. 3 is a side cross-sectional schematic view of an illumination system according to a second embodiment of the invention.

FIG. 3 shows a second embodiment of the present invention in which the shape of the main prism is different and the length of the light path from the collimating optics to the display panel is shorter. Shortening the light path allows the distance from the auxiliary prism to the display to be shorter. This relaxes constraints on the eyepiece design. It also allows the illumination from the aperture stop of the collection optics to be more easily made non-telecentric to the display panel. The non-telecentricity of the illumination apparatus provides that the principal rays impinging on the display panel are converging (see e.g. FIG. 4). This facilitates a wider field of view in the eyepiece optical system. It also allows both the illumination optics and the eyepiece optics to be more compact. Finally, the shortened optical path includes one less mirror, further reducing costs.

The main prism 141 of FIG. 3 has a triangular cross-section that is based on an equilateral triangle with two angles of 26.5°. The base of the triangle is positioned against the collector optics 103 and the display panel 101 which, as in the embodiment of FIG. 2, are positioned beside each other both directed into the prism. The prism is aligned to extend all the way across the display panel and the collector optics. In one embodiment, the vertex between the two equilateral sides is positioned to be opposite a point on the base side that is between the collector optics and the display panel. As shown in FIG. 3, since the collector optics has a lesser vertical extent than the display panel, one end of the prism's base side extends significantly beyond the collector optics and is removed to save weight and space. Typically, this corner will be cut off. As with the prism of FIG. 2, birefringence is low. However, to provide a higher incident angle for TIR, a higher index glass such as Schott F2 glass from Schott Glass Technologies or the equivalent is used. A preferred index of refraction is about 1.62. This higher index allows the prism to be flattened while maintaining TIR. A lower index allows for a thicker prism which may be preferred in some applications. The flatter prism also provides adequate tolerance to prevent vignetting of the display. Adjustments to the dimensions and shape of the prism can be made to accommodate different indices of refraction.

A central ray emanating from the collector optics will be transmitted into the base side of the prism toward the facing equilateral side. This side has a mirror coating such as the dielectric-silver-dielectric coating discussed above with respect to FIG. 2. The light is reflected from this mirrored side and folded back toward the prism base at a high incident angle which produces TIR. The base side is coated with an anti-phase shift, anti-reflection coating as discussed above. After TIR, the folded light, as shown further by central ray 143, is folded toward a PBS layer 145 of the type discussed above which redirects the light directly onto the display panel 101. Light reflected from the display panel passes through the PBS 145 to an auxiliary prism 147, through the final analyzer 135, for example, a dichroic polarizer, to be imaged by the eyepiece 111 at the exit pupil 113.

The auxiliary prism 147 in this embodiment differs from the auxiliary prism 109 of FIG. 2 in that its shape has been modified to align with the differing angles of the main prism. Accordingly, its cross-sectional shape is a right triangle with an angle of 63.5° at the corner closest to the display panel. This complements the 26.5° angle of the main prism to create the PBS and to compensate for the astigmatism of the main prism.

Figure 4:
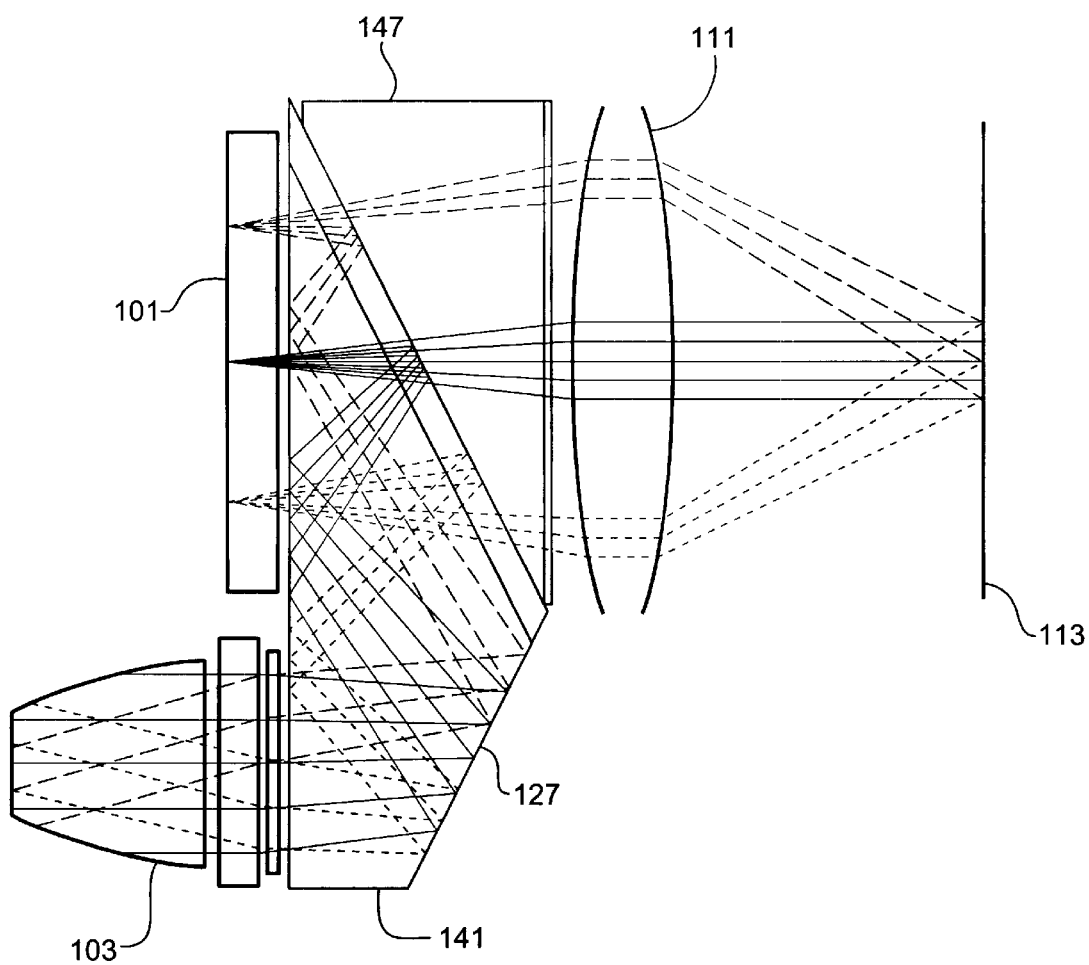
FIG. 4 is a side cross-sectional schematic view of the frontlight and a simple eyepiece of FIG. 3 showing light paths for principal and non-axial rays.

FIG. 4 is a ray tracing through the illumination system of FIG. 3 showing an axial ray and sets of off-axis rays. As can be seen in FIG. 4, the illumination from the collection optics 103 is converging toward the display panel 101 after being folded through the prism. It then diverges from the display panel into the auxiliary prism 147 and the eyepiece optical system 111. Using this illumination system it has been possible to create a retrofocus eyepiece with a short effective focal length of, for example, 18.3 mm and a very large aperture of f/1.3 in the horizontal and f/2.7 in the vertical. The short effective focal length permits a very wide field of view of about 36 degrees even with small displays. The large aperture permits a large exit pupil especially in the horizontal of about 12 mm, which allows the display to be used without adjustment by viewers with very different interpupillary distances. Improved optical performance is obtained by matching the entrance and exit pupil so that the entrance pupil of the eyepiece is coincident to the exit pupil of the main prism and the display.

Figure 5:
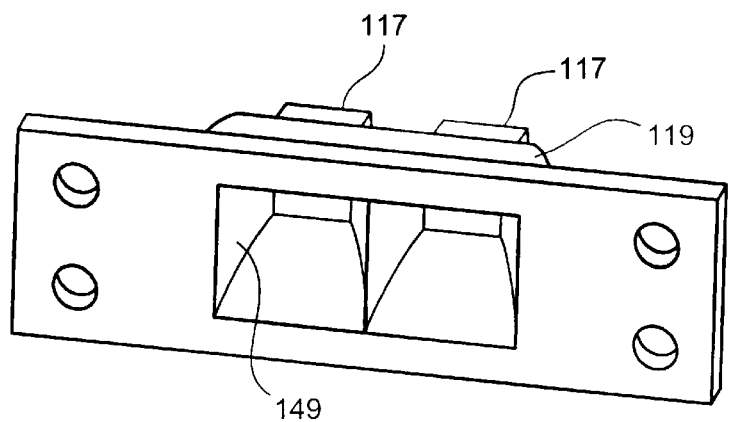
FIG. 5 is a perspective view of an integrated collector funnel piece for the collection optics of FIG. 6.
Figure 6:
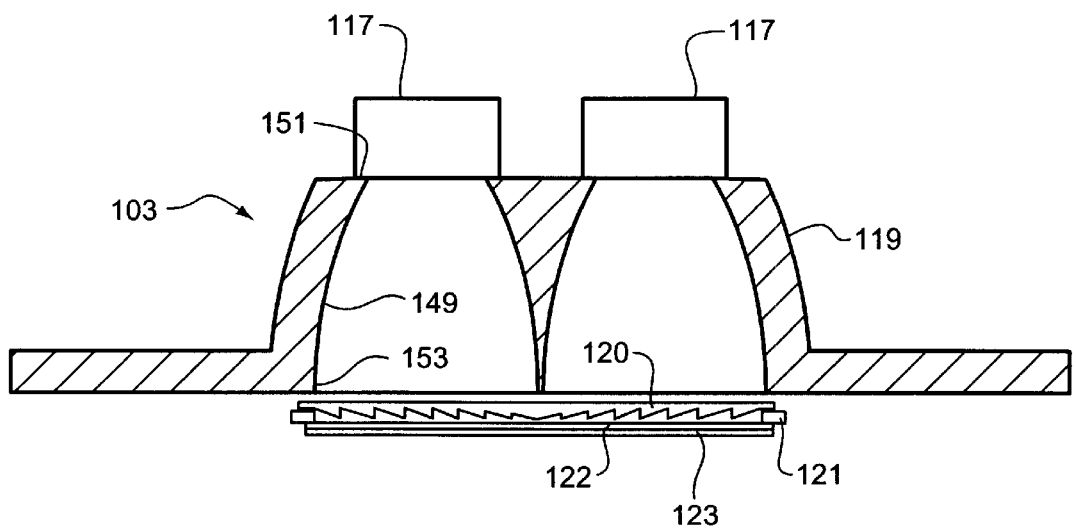
FIG. 6 is a cross-sectional side view of LED and collection optics suitable for the illumination system of FIGS. 2 and 3.

FIGS. 5 and 6 show the LED and collection optics of the illumination system according to one embodiment of the present invention. The prisms described above can be used with other sources of light and similarly, the collection optics described below can be adapted to work with other optical systems including other prism designs. In the described embodiment, the light source 103 is made up of red, green, and blue LEDs adjacent to one another. Instead of LEDs, laser diodes, cold cathode or field emitter cathodoluminescent sources, incandescent, and fluorescent lamps together with a switchable color filter, or any other appropriate light source can be used. Collimating lenses, diffusers, and collectors can also be used as shown or in other ways to control the nature of the illumination. The particular design of the light source is not essential to the prism design. In a monochrome version, single color LEDs or other light sources can be used.

The collimating optics 103 is built around a pair of reflector funnels 119 integrally formed as a single piece. This piece is shown in FIG. 5 without many of the other components shown in FIG. 6. As mentioned above, using two funnels allows for a 2:1 aspect ratio for the light source which matches nicely to the exit pupil shape. For different shaped exit pupils, the configuration can be altered. A monocular display, for example can have an aspect ratio of 4:3 for both the display and the exit pupil or a 1:1 aspect ratio for the exit pupil. This aspect ratio can easily be accomplished using a single LED package and reflector funnel. The reflector funnels are molded from a suitable rigid material such as polycarbonate. In one embodiment, the inside surface is shaped as a parabolic reflector and specifically a truncated compound parabolic concentrator with four symmetric parabolic sides. These sides are coated so as to form a mirror or are designed to enable TIR without a coating. A suitable mirror coating can be, for example opaque silver. The integrated reflector funnel piece includes a mounting surface 151 at the narrow end of the funnels for the LED packages 117, such as a 3-in-1 RGB LED package. At the broad end of the funnel 153 a mounting bracket (not shown) is provided for the Fresnel lens 120 mentioned above.

The reflector funnels and the main prism are designed such that there is an aperture stop 121 at or immediately below the Fresnel lens. This aperture stop can coincide with the diffusion plate 122. Alternatively, the diffusion plate can be integrated into or placed above the Fresnel lens. The diffusion plate is selected to provide enough diffusion to prevent any LED from being visibly imaged to the viewer 115, to compensate for the slightly off-axis locations of the three LEDs, in multiple color systems and to minimize any loss of light. A suitable low absorption, high transmission material is a thin plastic bubble volume diffuser such as model 100LSE, available from Kimoto in Japan. A variety of other diffusers can be used as is well-known in the art. This arrangement provides the proper mixing of the light so that the light from the light source 117 provides a substantially uniform brightness of light across the diffuser. Finally the pre-polarizer 123 is applied to the exit from the reflector funnels.

When operating a color version of the miniaturized display system, light of each of the three colors is directed into the reflector funnels 119 at different times in a repeating pattern. With some display panel types, the light can also be modulated to produce the proper gray scale image desired for that particular color. The three colors are cycled at a frame rate or speed sufficiently fast to cause the viewer's eye to integrate the three different colored gray scale images into an integrated color image. Because the exact location of each of the three different colored LEDs of the light source 117 is slightly different, if there were no diffuser 121, each LED would form a corresponding image at the exit pupil. Each image would be spaced apart from the images formed by the other LEDs. This is less of a problem for a display with a single LED since there would only be one image with corresponding brightness variation in the pupil. However, with a color display, the different LED image locations can result in shifts in the color of the perceived virtual display image with movement of the viewer's pupil. The diffuser together with the reflector surface minimize this color shift. Although the above example has been described using red, green, and blue light, it should be understood that the present invention is not limited to these specific colors. Also, although only three colors were described, the present invention would equally apply regardless of the number of colors of light being used.

In one embodiment, the funnels are designed as CPC's (compound parabolic concentrators) which are truncated and include a complementary Fresnel lens. However, the prisms and other components of the present invention can use any of many different well-known light sources including light boxes and other types of collimators, collectors and back lights. In addition, the LEDs can be replaced with laser diodes, cold cathode or field emitter cathodoluminescent sources, incandescent and florescent lamps. Single or multiple light sources can be used to create white, colored, or multi-colored light.

The CPC can be hollow as illustrated or filled with a dielectric. In the illustrated embodiment, the light is collected in air and reflected from a mirror surface. Alternatively, the CPCs can be formed of a solid optical material in which the light is collected and the mirror surface can be applied to the exterior of the funnel-shaped piece before the air interface. No coating need be applied if a solid CPC is designed to use TIR for reflecting the light. With a solid CPC, instead of a hollow CPC the Fresnel surface can be incorporated into the solid surface. If the CPC is constructed from a moldable plastic material, the Fresnel lens can be molded on the exit aperture, or broad end 153 of the funnel opposite the LEDs.

In one embodiment using conventional 3-in-1 LED packages, the LEDs are embedded into a transparent resin that has a surface measuring 2.6 mm square. This surface can be regarded as a Lambertian emitter. As mentioned above, in the embodiment shown, the funnels are each formed as an air filled, truncated compound parabolic concentrator (CPC) and are used to collect light from a Lambertian emitter. The Lambertian emitter face size is 2.6 mm×2.6 mm. The collected light is then transformed by the CPC into a larger area emitting aperture with a smaller emitting solid angle. In this instance, the desired emitting aperture area and solid angle can be determined by backwards ray tracing through the eyepiece and frontlight from the exit pupil (at the eye) to the output plane of the CPC.

In one embodiment, the fresnel lens is designed to accept telecentric illumination from the CPC aperture and change it to non-telecentric illumination to match the eyepiece non-telecentricity. The CPC aperture size and emitting angle are designed to be a closest possible etendue match to the LED package's emitting area and angle.

The dual CPC aperture, being conjugate to the desired exit pupil, has a 2:1 aspect ratio, the same as the exit pupil. The 2:1 ratio can be achieved by tiling two LED packages each having a four sided CPC collector. Each collector has four ruled parabolic surfaces that join together to form square entrance and exit apertures. In other words, four orthogonal parabolic extrusions are formed that are joined together at right angles. The shape of the parabola is described below. The tiling allows CPC collectors to be designed that closely match the etendue requirements of the LED package. This provides very efficient collection of light. From etendue considerations, the desired output aperture size is 10.4 mm×5.2 mm. Ray tracing as shown below, yields an emitting angle of 27 degrees. The output aperture therefore can be implemented with two CPC's with output aperture size 5.2 mm×5.2 mm and an emitting angle greater than or equal to 27 degrees.

Figure 7:
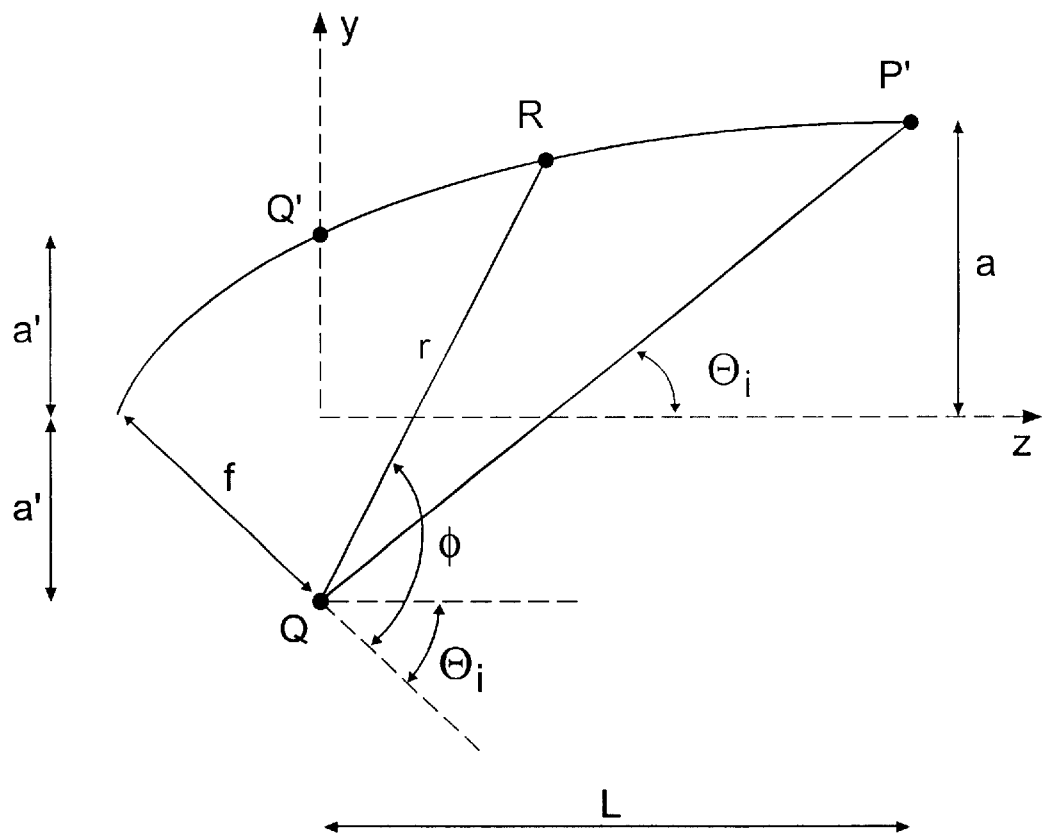
FIG. 7 is a graph showing an offset parabola suitable for a compound parabolic concentrator.

FIG. 7 shows how the edge ray principle is applied to the CPC design, and shows terms for use defining the parabolic reflector shape. In FIG. 7 the parabolic surface from Q' to P' is plotted on orthogonal axes Y and Z. The point, P, is at the output aperture edge of the CPC. Points Q and Q' are at the input (LED) edge of the CPC and define the edges of the 2.6 mm×2.6 mm emitter area of the LED package. The distance a is the half-width of the output aperture. The distance a' is the half-width of the input aperture. The distance, f is the focal length of the parabola and the angle $\phi$ is a variable that traverses all possible input angles from the edge ray input angle $\Theta_i$. The ray, QR is an included example ray within the range of $\phi$. The output angle for the most extreme edge ray is $\Theta_i$. The input angle is 90 degrees since the emitter is Lambertian.

In reverse operation, the CPC acts as a collector of rays from the output side. The "edge ray" is the ray from point P' to Q. The edge ray principle requires that all rays entering the collector at extreme angle $\Theta_i$ leave the collector at the edge of the collector Q'. Rays with angles less than $\Theta_i$ are then collected between points Q and Q' with high efficiency. Assuming perfectly reflecting walls, all rays with angles less than $\Theta_i$ are perfectly collected. The tilted parabolic shape of the CPC ensures all rays with angle $\Theta_i$ are imaged at the point Q.

In addition, the depth of the CPC can be reduced (or truncated) for compact packaging. The CPC's depth can also be determined by the edge ray principle. It is possible to significantly truncate the CPC and still achieve excellent light collection. For compact packaging, the CPC can be truncated. If the input and output aperture sizes (a' and a) are fixed and the output angle is increased, the length of the CPC can be truncated with a very small effect on the light collection efficiency. In the illustrated implementation, the input angle is chosen to be 30 degrees. The specific amount of truncation can be selected to accommodate different packaging and collection efficiency demands.

One approach to determining a shape for the CPC is illustrated below.

| | |
|---|---|
| a' = 1.3 | The half-width of the LED package emitting area. |
| $\Theta_i = (30/180) \cdot \pi$ | Input angle in radians. 30° is selected as an input angle. |
| $\Theta_0 = 2 \cdot \Theta_i$ | |
| $\Theta_1 = \pi/2 + \Theta_i$ | |
| $\Theta_1 \geq \phi \geq \Theta_0$ | Variable $\phi$ (ranges from $\Theta_1$ to $\Theta_0$, see diagram above). |
| $f = a'(1 + \sin(\Theta_i))$ | Parabola focal length supplies the appropriate curvature. The shape can be plotted as a function of y and z. |
| f = 1.995 | |
| $y(\phi) = [(2f \sin(\phi - \Theta_1))/(1 - \cos \phi)] - a'$ | y position as a function of $\phi$ |
| $z(\phi) = (2f \cos(\phi - \Theta_1))/(1 - \cos \phi)$ | z position as a function of $\phi$ |
| trunc = 2.6 | Value of the selected output aperture. The width of the parabola can be determined, for example, by graphing y $\phi$ and z $\phi$ to find a length that provides a value of 2.6 mm for a. In this example L = 5 mm so that $z(\phi)$ = 5 mm when y ($\phi$) = 2.6 mm. |

The Fresnel lens 120 is a converging element which reduces the divergence of the light emanating from the exit aperture of the funnels. The Fresnel surface, in one embodiment is made of acrylic with a refractive index of 1.4917 and has a conventional anti-reflective coating. It can be defined using the following equation as:

$$Z=((x^2/R)/(1+(1-(1+k)x^2R^2))^{1/2})+ax^4+bx^6+cx^8+dx^{10}$$

Where R is the vertex radius of the optical element.

R=9.1445 mm k=0

| | | | |
|---|---|---|---|
| a = 0 | b = 0 | c = 0 | d = 0 |

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a binocular headset, the apparatus described herein are equally applicable to any type of illuminator for a small reflective display whether for one eye or both, especially one in which compactness and a wide field of view are desired. For example, the techniques described herein are thought to be useful in connection with compact computer and data device displays, monocular headsets, digital camera viewfinders, camcorder viewfinders, internet appliance viewers, mobile communicator viewers and entertainments headsets for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An illuminator for a reflective display panel comprising:
    a light source;
    a prism having a first substantially planar face proximate to the light source and the display panel, so that light propagates from the light source into the prism through the first face and is redirected to the display panel through the first face;
    a second face of the prism opposite the light source so that light reflected from the display panel impinges on the second face and propagates to imaging optics.

2. The illuminator of claim 1, further comprising an auxiliary prism between the first prism and the imaging optics to correct for astigmatism of the reflected light from the display panel.

3. The illuminator of claim 2, further comprising a beam splitter between the first prism and the auxiliary prism and wherein light from the light source is reflected by the beam splitter to the display panel and light reflected from the display panel is transmitted by the beam splitter to the imaging optics.

4. The illuminator of claim 3, wherein the display panel form an image by altering polarization states of light reflected from the display panel and wherein the beam splitter is a polarizing beam splitter.

5. An illuminator for a reflective display panel comprising:
    a light source;
    a prism having a first substantially planar proximate to the light source and the display panel, so that light propagates from the light source into the prism through the first face and is redirected to the display panel through the first face;
    a second face of the prism opposite the light source so that light reflected from the display panel impinges on the second face and propagates to imaging optics;
    an auxiliary prism between the first prism and the imaging optics to correct for astigmatism of the reflected light from the display panel; and
    a polarizing beam splitter between the first prism and the auxiliary prism, wherein light from the light source is reflected by the beam splitter to the display panel and light reflected from the display panel is transmitted by the beam splitter to the imaging optics, wherein the display panel forms an image by altering polarization states of light reflected from the display panel, and wherein the beam splitter is a wire grid polarizer.

6. The illuminator of claim 5, wherein the prism has a mirror surface opposite the light source to reflect light received from the light source, the mirror surface being angled to cause total internal reflection of light reflected from the mirror surface off the first face.

7. The illuminator of claim 6, further comprising a third face oriented to reflect light after total internal reflection to the display panel.

8. The illuminator of claim 7, wherein the third face comprises the second face and further comprises a beam splitter.

9. The illuminator of claim 6, wherein the mirror surface comprises a first portion opposite the light source and a second portion adjacent the first portion, the portions being configured such that light from the light source is first reflected from the first portion to the second portion and then to the first face of the prism.

10. The illuminator of claim 5 wherein the prism has a substantially triangular cross section and wherein the second face has a reflective portion opposite the light source and a partially reflective portion opposite the display panel.

11. An illuminator for a reflective display panel comprising:
   a source of diverging light;
   a converging optical element to receive light from the light source, said converging optical element comprising a Fresnel lense;
   a prism having a first face to receive light from the converging optical element, the prism receiving light from the light source and redirecting it as converging light to the display panel; and
   a second face of the prism opposite the display panel for receiving light reflected from the display panel and propagating the reflected light to imaging optics.

12. The illuminator of claim 11, wherein the light source comprises a light emitter and a reflective funnel, the reflective funnel directing the light to the converging optical element.

13. The illuminator of claim 12, wherein the reflective funnel comprises a shaped compound parabolic concentrator with a reflective surface to direct light to the converging optical element.

14. An illuminator for a reflective display panel comprising: a source of diverging light non-telecentric with respect to the display panel; a converging optical element to receive light from the light source; a prism having a first face to receive light from the converging optical element, the prism receiving light from the light source and redirecting it as converging light to the display panel; and a second face of the prism opposite the display panel for receiving light reflected from the display panel and propagating the reflected light to imaging optics.

15. The illuminator of claim 14, wherein the prism first face and all surfaces for redirecting light from the light source to the display panel are substantially planar surfaces.

16. An illuminator for a reflective display panel comprising:
   a source of diverging light;
   a converging optical element to receive light from the light source;
   a prism having a first face to receive light from the converging optical element, the prism receiving light from the light source and redirecting it as converging light to the display panel; and
   a second face of the prism opposite the display panel for receiving light reflected from the display panel and propagating the reflected light to imaging optics, wherein the prism has a mirror surface opposite the light source to reflect light received from the light source, the mirror surface having a Fresnel surface.

17. The illuminator of claim 16, further comprising an aperture stop proximate the converging optical element and wherein an image of the aperture stop is formed at an exit pupil of the illuminator, the exit pupil being located at a finite distance from the display.

18. The illuminator of claim 17 wherein the exit pupil is formed by the converging optical element and the prism.

* * * * *